Aug. 7, 1945.  C. C. McCONKLE  2,381,762
FORCED DRAFT CONVEYER
Filed Dec. 18, 1944

Inventor
C. C. McConkle
By Arthur H. Sturges
Attorney

Patented Aug. 7, 1945

2,381,762

UNITED STATES PATENT OFFICE 2,381,762

FORCED DRAFT CONVEYER

Charles C. McConkle, Omaha, Nebr.

Application December 18, 1944, Serial No. 568,567

1 Claim. (Cl. 302—37)

The present invention relates to conveyers and has for an object to provide a mechanism for gathering, conveying, elevating and delivering material in a manner more efficient and economical than has been practiced heretofore.

More specifically, it is an object of the invention to provide a mechanism for unloading kernels of corn or similar small grains from a box car and without an employment of hand labor for shoveling purposes, said mechanism being so constructed that a car of grain cannot only be unloaded by an employment thereof but will also, in instances where so desired, deposit said material in a heap at a location remotely disposed with respect to said box car. Also the invention contemplates an elevation of said material in instances where so desired, said device being particularly efficient for use in conjunction with grain elevators and the like.

A still further object of the invention is to provide a mechanism for gathering, transporting and disposing material such as sawdust, rock salt, slack coal, sand and the like, together with an elevation of said materials into or out of a storage bin or the like.

A particular object of the invention is to provide a device for said purposes, having blower fans so arranged that during a passage of said material through the conduits of the mechanism that said material does not injuriously impinge against the blades of said fans, whereby the material at the time of delivery thereof from the outlet end of the mechanism is, substantially, in the same condition as prior to a passage of said material through the mechanism.

A still further and important object of the invention is to provide a device for the above stated purposes, the parts of which are so constructed and arranged that the intake conduit of the blower fan housing thereof may be elevated or lowered selectively for consummating work of certain types.

Other and further objects and advantages of the invention will be understood from the following detailed description thereof, reference being had to the accompanying drawing in which.

Referring now to the drawing for a more particular description in which like numerals of reference designate like or corresponding parts throughout the several views, 10 generally indicates the new conveyer.

Figure 2:
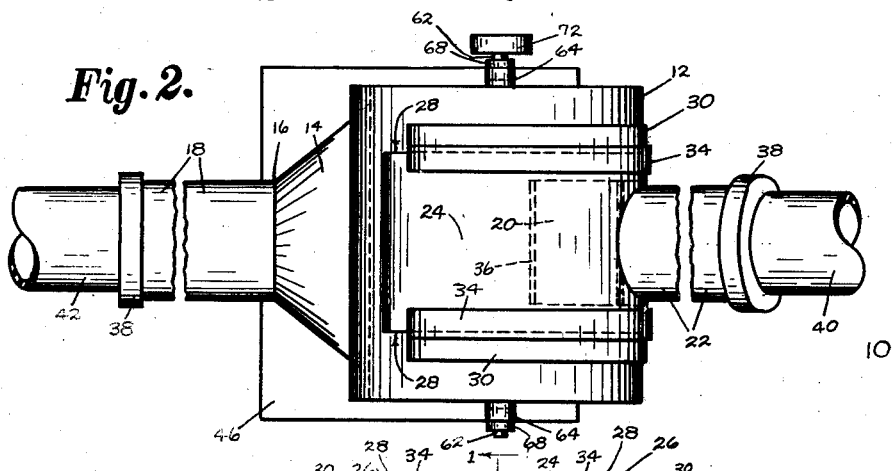
Figure 2 is a top plan view of the mechanism shown in Figure 1.

The mechanism includes a cylindrical housing 12, having an outlet 14 which, as best shown in Figure 2, is of substantially the same width as the length of the housing 12. The outlet 14 converges from its wider end to its restricted end or throat portion 16 where it is joined to a tubular portion 18 and it will be understood that said outlet 14, together with its portions 16 and 18, may be manufactured integral with the cylindrical housing 14 as shown, or may be formed of sectional pieces of sheet metal joined together by any suitable means such as welding or the like.

The annular wall of the housing 12 is provided with an elongated opening 20, said opening being approximately as wide as the intake conduit 22 of the new device.

Figure 1:
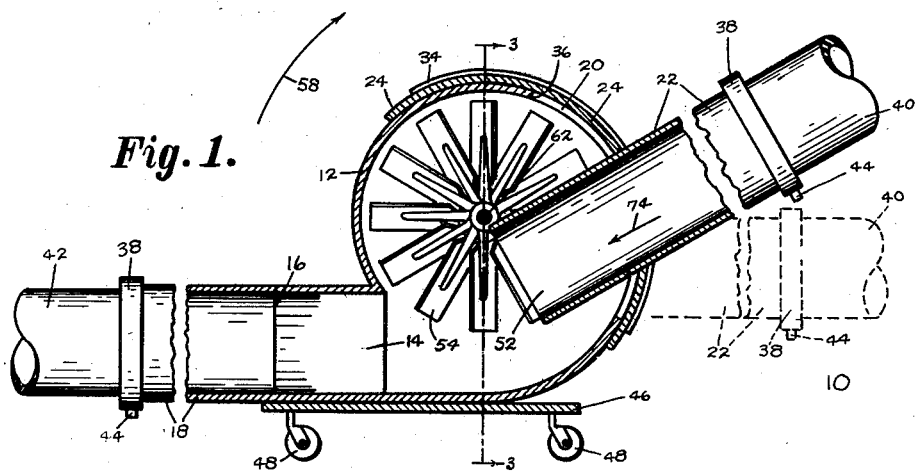
Figure 1 is a longitudinal vertical section of the new device, certain portions thereof being broken away; the view being taken approximately on the line 1—1 of Figure 3.

As best shown in Figure 1, the conduit 22 extends through the opening 20 and into the housing 12 an appreciable distance for disposing its outlet orifice 52 approximately half-way across the interior of the housing for purposes later described.

The opening 20 is provided with a slidable cover 24 which, as shown in Figure 2, is wider than the opening 20 and is also of an appreciable greater length than said opening, whereby the cover 24 maintains the opening 20 closed at all times. The cover is freely slidable since the cover is of a complemental arcuate shape with respect to the cylindrical cross sectional contour of the housing 12.

Figure 3:
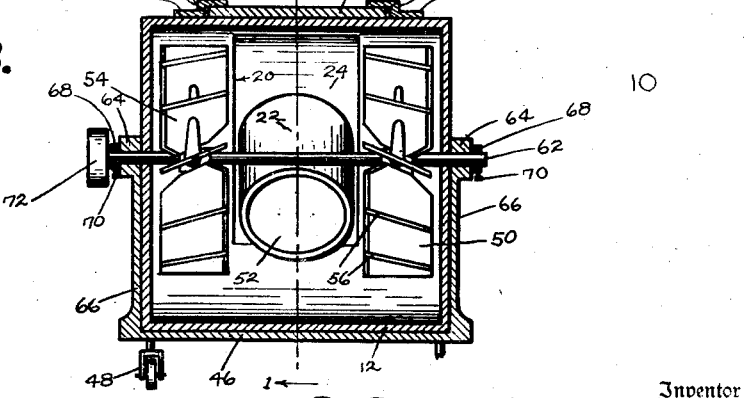
Figure 3 is a transverse vertical section taken approximately on the line 3—3 of Figure 1, a wheel of a dolly truck, preferably employed, being broken away.

A guide rail 26 is disposed at each of the oppositely disposed edges 28 of the cover 24. As best shown in Figure 3, each guide 26 includes a base portion 30 which is welded, riveted or otherwise suitably secured to the arcuate wall of the housing, said base portion 30 being formed integral with an outwardly disposed arm portion, the latter being provided with a flange portion 34 which laps over the adjacent edge 28 of the cover 24 for preventing a passage of air through the opening 20 and for holding the slidable cover 20 snugly against the housing 12.

The conduit 22 is disposed through the cover, as shown in Figure 1, being welded or otherwise suitably secured to said cover and as thus described, it will be understood that the conduit 22 may be moved from the full line position thereof, as shown in Figure 1, downwardly to its dotted line position as shown in said figure and similarly the conduit 22 may be moved upwardly until the conduit strikes the upper wall 36 of the opening 20 and without a passage of air through the opening 20.

On the outer ends of the conduits 18 and 22, each are provided with a slip ring 38 which may be turned transversely of the conduits approximately 90 degrees for locking the flexible extensions 40 and 42 respectively to the conduits 22 and 18 and in order to facilitate turning of the slip rings 38 each is provided with an outstanding lug 44 arranged to be received in the eye end of a wrench, not shown, whereby the conduits 40 and 42 may be readily attached to and detached from the conduits 22 and 18. The rings 38 are similar in construction to the rings at the ends of a length of conventional fire hose.

The extension conduits 40 and 42 may be formed of rubber and laminations of canvas for providing said conduits of semi-flexible characteristics similar to a fire hose. Also said conduits 40 and 42 may, if desired be formed of tubular sheet metal having swivel joints at the ends of each section. Furthermore, if desired, said conduits may each be formed of a helically disposed length of wire of suitable gauge, the convolutions thereof having a covering formed of airtight material such as rubberized canvas.

The conduits 40 and 42 may be of any length desired for extending around corners, up or down stairways, through the doors of grain cars and towards either end of a car for facilitating a handling of material as later described, and while it is true that said conduits 40 and 42 are bendable, yet they are provided stiff enough so that the passageways therethrough will not become choked resultant from said bending. Since said conduits are stiff enough to be approximately of form-sustaining character as to the cross sectional contour thereof, they are also stiff with respect to their longitudinal length. The conduit 40 is joined to the movable intake conduit 22 so that the conduit 40, in instances where it is not of great length, may be disposed directly through a box car doorway opening and without becoming choked by bending, since for this purpose the intake conduit 22 is moved to the full line position thereof shown in Figure 1. The outlet conduit 18 need not be movable with respect to the housing 12 since the extension 42 of the conduit 18 is of a greater length than the conduit 40.

It will be understood that the capacity or bore of the above mentioned conduits may vary. However, for practical purposes, said conduits are fairly large together with the blower fan housing 12 and later described fans, whereby in order to facilitate transportation of the apparatus to and from work, the housing 12 is preferably mounted on the platform 46 of a dolly truck and the latter, as best shown in Figure 1, is provided with a plurality of caster wheels 48, four of the latter being preferably employed.

The mechanism further includes a pair of fans. The fan 50 is disposed at one side of the outlet orifice 52 of the conduit 22 and the like fan 54 is disposed at the other side of said orifice.

Since the fans are disposed at the sides of the conduit 22 and the end of the latter, within the housing, extends nearly to the middle of the housing, material passing through the housing 12 does not impinge against the rotating blades of the fans.

As shown in Figure 3, the outer ends 56 of the fan blades of the fan 50 are inclined and since the fan rotates in the direction of the arrow 58, air moved by the blades 56 is directed towards the restricted throat of the outlet 14 of the housing. Similarly, the outer ends of the fan blades of the fan 54 are inclinedly disposed for directing air moved by said blades towards said throat and since the capacity for moving air of the fans 50 and 54 is equal, said inclination of the blades facilitates a moving of material towards said throat.

The fans 50 and 54 are each keyed or otherwise suitably secured to a transversely disposed axle shaft 62. The shaft extends through pillow blocks or trunnions 64 which are supported on the upper ends of the oppositely disposed standards 66.

As shown in Figure 3, the standards 66 are formed integral with the platform 46 and it will be understood that said standards may be welded or otherwise suitably secured to said platform.

In order to prevent longitudinal movement of the shaft 62 and said fans, adjacent the outer ends of the shaft 62, the latter is provided with a collar 68 at each of said ends. The collars are secured to the shaft 62 by means of set screws 70. At one end of the shaft 62, a driver pulley 72 is provided. The pulley is adapted to be driven by a belt and motor, not shown, or other suitable means may be employed for rotating the shaft 62 in the direction of the arrow 58. Preferably an electrical motor is employed and carried by the platform 46 in instances where the device is employed in the open air.

When employed in a defined space where an explosion of grain dust might occur resultant from electrical sparks generated by the motor, the latter is discarded and belts are provided extending from the pulley 72 remotely with respect to the said confined space.

It will be understood that the conduit 42 may be of any length and formed of sections, each section being provided with a slip ring 38 for attaching and detaching additional sections and the same is true with respect to the conduit 40, although for a majority of uses, the conduit 40 is comparatively short.

In operation, the fans being rotated in the direction of the arrow 58, suck air in the direction of the arrow 74 and through the conduits 40 and 22 and since the intake end of the conduit 40 is abutted against a pile of material to be moved, said material becomes sucked into the conduit 22 and discharged through the outlet orifice 52 thereof and into the bottom of the housing 12. The continuous rotation of the blower fans in the said direction forces a draft of air, together with material being moved, into the outlet 14 and through the restricted throat 16 into the conduit 42 and through the conduit 42 to a selected location. At times when the material is to be elevated for storage and at times when the height is great enough to necessitate the same, two or more of the devices of the present invention may be employed; one disposed above the other, whereby the material is moved upwardly in stages.

For use in unloading a grain car where the space between the car and the wall of a grain elevator is comparatively narrow, the conduit 22 is adjusted with respect to the housing 12 so that the outer end of the conduit 22 points straight toward the doorway of the car, together with the conduit 40 for eliminating an otherwise necessary bend in the conduit 40.

From the foregoing description, it is thought to be obvious that a forced draft conveyer constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish it to be understood as limiting myself to the precise arrangement and formation of the several parts herein shown in carrying out my invention in practice, except as claimed.

I claim:

A conveyer mechanism having in combination, a cylindrical housing provided with an elongated opening disposed through the arcuate wall thereof; guide rails disposed in approximate parallelism; said rails being secured to said housing at opposite sides of said opening; a cover of greater width and length than said opening having oppositely disposed side edges disposed between said rails; the latter having flanges disposed over said cover for holding the cover snugly against the housing during sliding movements of the cover with respect to said housing; an intake conduit disposed through and secured to said cover; said housing having an outlet conduit disposed in approximate alignment with said intake conduit, the latter extending approximately half-way across the interior of the housing; a pair of fans having a common axle, ends of the latter being disposed through end walls of the housing; said fans being respectively disposed at each side of the outlet orifice of said intake conduit and within said housing; means for preventing longitudinal sliding movements of said axle; and a driver for said axle.

CHARLES C. McCONKLE.